Feb. 18, 1958 O. SALADIN ET AL 2,823,982
PRODUCTION OF FINELY DIVIDED METAL OXIDES
Filed Feb. 11, 1949 3 Sheets-Sheet 1

INVENTORS
OTTO SALADIN
WALTER FREY
BY
ATTORNEYS

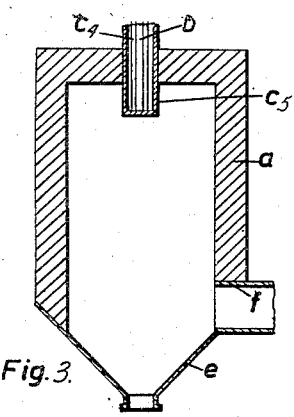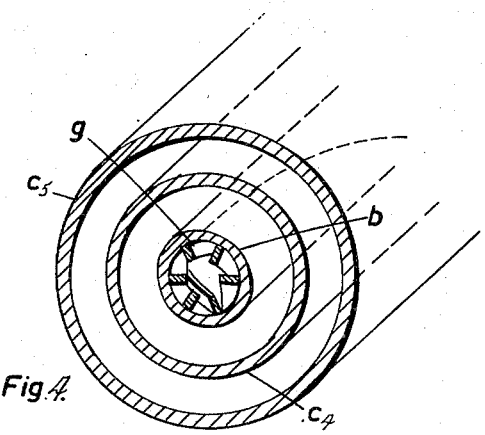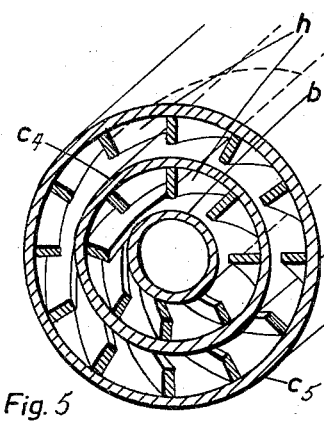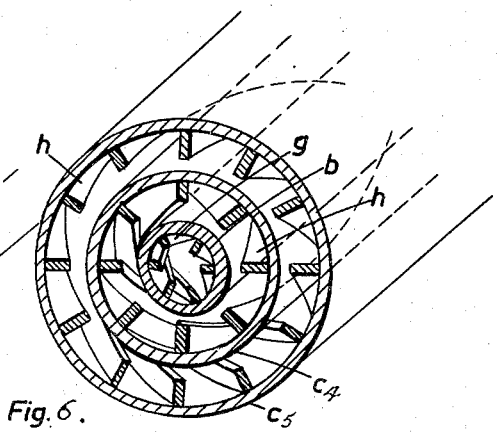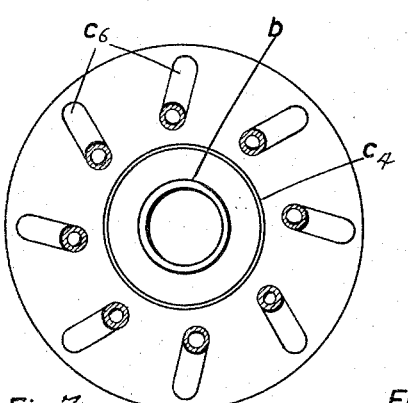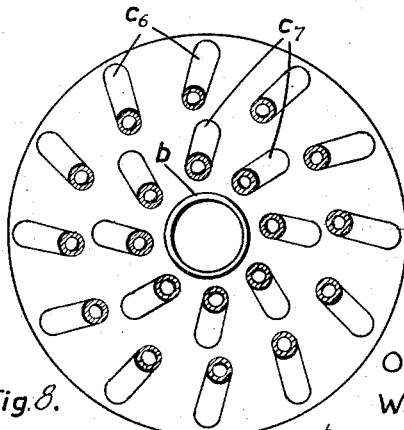
Inventors
Otto Saladin
Walter Frey 2,823,982
Patented Feb. 18, 1958

2,823,982
PRODUCTION OF FINELY DIVIDED METAL OXIDES

Otto Saladin, Schweizerhalle, and Walter Frey, Basel, Switzerland, assignors, by mesne assignments, to Fabriques de Produits Chimiques de Thann et de Mulhouse, Thann (Haut-Rhin), France, a corporation of France Application February 11, 1949, Serial No. 75,886

Claims priority, application Switzerland February 20, 1948

13 Claims. (Cl. 23—202)

This invention relates to certain improvements in or relating to the production of finely divided metal oxides by the decomposition of volatile metal chlorides by means of oxygen-containing gases at high temperatures under formation of flames.

The term "oxygen-containing gases" as used in this specification is meant to include pure oxygen.

"Volatile metal chlorides" in the sense of this specification are metal chlorides, including silicon chloride, which are sublimable or distillable and can be volatilized at temperatures below 500° C. The invention relates, more particularly, to the decomposition of volatile anhydrous chlorides of metallic elements from groups 3 and 4 of the periodic system, such, for example, as titanium tetrachloride, silicon tetrachloride, zirconium tetrachloride, aluminum chloride, and tin tetrachloride.

It is known that volatile metal chlorides, such as titanium chloride, zirconium chloride, etc., and also silicon chloride can be transformed with oxygen, air or other oxygen-containing gases at temperatures above 500° C. to the respective metal oxides. In order to obtain products which are completely oxidized, i. e. which do not contain any non-decomposed chlorides nor oxychlorides, it is absolutely necessary that the metal oxide particles, more particularly in statu nascendi, pass through a temperature zone of at least 800, but preferably 950 to 1100° C. The reaction of the volatile metal chlorides with oxygen in general is exothermic; but it has been found by the researches made in connection with the present invention that in practically carrying out the reaction the exothermic reaction heat is not sufficient actually to reach the required high temperatures, starting from the cold or only moderately preheated reaction components in the reaction zone; in fact, it is not even sufficient to maintain said temperature. More particularly, the very intensive radiation of the metal oxide particles formed causes a very considerable loss of heat within the reaction zone. Hence, it follows that it is necessary to feed additional heat.

It is particularly difficult to produce metal oxides of highest fineness which meet the requirements of the pigment color industry which for most of the oxides to be manufactured from the volatile chlorides represents the main field of application. The simplest way of feeding the additional heat would consist in heating the reaction chamber from outside, a measure which would seem to make possible the flameless decomposition of the metal chlorides in a diffuse reaction. But in the hitherto known processes, which involve separate feeding of the reaction components, even in case of decomposition of the metal chlorides under formation of flames the application of this heating method was not a success, owing to the unavoidable wall reactions which cause incrustation of the walls and agglomeration of the metal oxide particles obtained in loose condition.

It has been attempted, therefore, to feed the required additional heat to the decomposition process entirely or partly by separately preheating the gases to be reacted, i. e. metal chloride on the one hand and oxygen or oxygen-containing gases on the other hand, to temperatures of 800 to 1000° C. and then exposing them to the reaction.

However, in carrying out this process on a technical scale, the very preheating causes considerable difficulties. Both the metal chlorides and the oxygen-containing gases are extremely aggressive at these temperatures and attack the known metals and alloys to such an extent that only ceramic materials can be used as a material for constructing the preheaters, feed pipes, nozzles, etc. Another difficulty consists in the danger of obstruction of the feed pipes, since the reaction components at the required preheating temperatures react already immediately as they meet each other and after a short time give rise to obstruction of the outlets of the gas feeding channels.

Another known method consists in that the metal chloride vapor is mixed with a combustible gas, distributed in the oxygen-containing atmosphere, ignited and exposed to the reaction under formation of a flame. The heat which can be produced additionally in this process by combustion of the combustible gas ought to be sufficient to maintain the reaction once initiated between combustible gas or metal chloride on the one and oxygen-containing gas on the other hand, even in case of only a moderate preheating of the initial products. It has been found, however, that a mixture consisting of a combustible gas and metal chloride if only slightly preheated, is very difficult to ignite in an oxygen-containing atmosphere, that the flame once formed tends to go out again and, moreover, that metal chloride vapors even in small quantities increase the ignition temperature of combustible gases considerably—by several hundred degrees centigrade. The process just described therefore can be carried out only if large quantities of combustible gases in proportion to the quantity of metal chloride are used, whereby the process becomes uneconomical, however.

Finally, the decomposition of silicon tetrachloride was attempted in such a way that the same, mixed with hydrogen and a small quantity of air, is ignited in burners of small dimensions under rotary cylinders and decomposed, drawing the additional oxygen required for the formation of silicon dioxide from the outer atmosphetre. In order to carry out this process, a large excess of hydrogen is required, and owing to the danger of explosion only small quantities of oxygen-containing gases can be admixed to the silicon chloride vapor. Moreover, it is also known that this method after a short time leads to quick obstruction of the burner in case of the presence of metal chlorides which react more quickly than silicon tetrachloride with the steam forming in the burning flame. Moreover, the output of such a burner is very small.

Now, it has been found that all these difficulties can be overcome by the following procedure:

A mixture (reaction gas) of metal chloride vapor and oxygen-containing gas with a temperature above the dew point but not exceeding 500° C. is allowed to flow into the reaction chamber and is ignited therein to form a flame by being contacted therein with an auxiliary flame formed by an exothermic auxiliary chemical reaction. Advantageously the flame is ignited at a suitable distance from the discharge opening of the reaction gases flowing into the reaction chamber. This distance depends upon the discharge conditions of the gases and should be chosen in such a way that on the one hand obstruction of the discharge openings of the reaction gases through which the reaction gases are discharged into the reaction chamber, and, on the other hand, a diffuse reaction are avoided. The auxiliary flame not only serves for the ignition of the reaction mixture but may also generate enough heat to assure the desired completion of the reaction.

In fact it is possible to add to the metal chloride vapor oxygen-containing gas and even pure oxygen and even to heat this mixture to temperatures up to 500° C., without any reaction taking place such as it is the case with many mixtures of combustible gases with oxygen. Contrary to expectation it was found that such a mixture even with an oxygen content of any high amount can be ignited into a flame by contact with an auxiliary flame and thus can be brought to a quick reaction at temperatures above 1000° C. without flashing back of the flame to the outlet opening, and without consequent explosion within the feed pipe and the mixing device. This knowledge forms the basis of the above described new method.

Also, obstruction of the feed pipe, more particularly of the outlet opening, does not take place in this process, since the flame can be held without difficulties at some distance from the outlet opening by employing a suitable mixing ratio of the reaction gas mixture, by preheating the reaction gases to a suitable temperature, and by imparting to the reaction gases passing from their feed nozzles suitable exit velocities. Within the conditions coming into consideration on a technical scale, a minimum distance of about 1 mm., preferably from 3 mms. upwards, will be sufficient to prevent accumulations from clogging the outlet opening. For reasons of safety, however, the minimum distance will be made somewhat larger in practical operation. However, the ignition of the flame must not take place at too large a distance from the outlet opening, since the reaction otherwise might take a diffuse and possibly incomplete course. According to experience the maximum distance under the above mentioned conditions amounts to about 1 meter. Since in this process the metal chloride vapor is exposed to the reaction in a state of homogeneous admixture with at least part of the oxygen required for its transformation under formation of flames, the reaction, once it is started, proceeds much more rapidly than in case the reaction components are mixed only during the reaction. This is of a particular importance in view of the tendency of the primarily formed metal oxide particles to grow further. By the process according to the invention this chance, which otherwise is always existing, is not offered to them. This fact ensures the formation of a fine grain in a much higher degree than in the hitherto known processes. Also the development of heat within the flame is considerably facilitated and made more uniform. Where the reaction gas does not contain in itself the amount of oxygen required for complete reaction, the missing share is fed to the reaction in the form of any oxygen-containing gas mixture.

The amount of oxygen required by the metal chlorides for completing the reaction at any rate exceeds the stoichiometric quantity. This excess beyond the quantity of oxygen stoichiometrically required is different with the different metal chlorides; with titanium chloride, e. g. only a few percent by volume are required, while with stannic tetrachloride the excess should be a multiple of the stoichiometric quantity.

A particularly fine grain of the metal oxide is obtained where an excess of oxygen is admixed to the metal chloride. The grain size grows in the same ratio as the oxygen percentage of the reaction gas is reduced.

It is possible to carry out the exothermic chemical reaction with the aid of the oxygen component of the reaction gas mixture, feeding separately a combustible gas into the reaction chamber. Under these circumstances the reaction gas must not contain more than a relatively small amount of metal chloride vapor. On the other hand, the burning of the reaction mixture can be effected by an auxiliary flame supported by an exothermic chemical reaction in which the components of the reaction mixture do not participate actively and which is sustained by separate gas inflows. Advantageously, separate inflows of a combustible gas and an oxygen containing gas are reacted together to sustain the auxiliary or ignition flame, and all or at least a major part of the oxygen required for combustion of the combustible gas is supplied separately from the reaction mixture. If only part of that oxygen requirement is thus supplied, the remainder may be introduced in admixture with the combustible gas or with the reaction mixture. It is also possible to introduce a part of that oxygen requirement with the reaction mixture and to supply the remainder in part as a separate gas inflow and in part with the combustible gas. Of course, explosive mixtures of oxygen and combustible gas should be avoided.

As a combustible gas, hydrogen, carbon monoxide, illuminating gas, benzine vapors, oil vapors etc. can be used. In general, the combustible gas and the oxygen-containing gas fed at least partly separately for its combustion are advantageously delivered separately around the reaction gas current. The combustible gas, once being ignited, forms a constantly burning flame which ignites the reaction gas mixture at a certain distance from the outlet opening, owing to the activating effects of the auxiliary flame and the heating by the combustion products. Where carbon monoxide is used as a combustible gas, the same can be fed directly around the reaction gas current without causing a deposit at the outlet opening of the reaction gas, since the carbon monoxide reacts so slowly with the oxygen contained in the metal chloride vapor that it ignites with the same only at a certain distance from the outlet opening and only there inflames the reaction gas. In this case the separately fed oxygen-containing gas may be fed around the carbon monoxide. Where hydrogen-containing combustible gases are fed, on the other hand, the oxygen-containing gas is advantageously fed in the intermediate layer, for the following reason: Since the hydrogen fed in the intermediate layer would react very quickly with the oxygen contained in the metal chloride vapor under formation of water, which in turn would cause an immediate decomposition of the metal chloride, the reaction gas outlet would be obstructed in a short time.

Particularly fine metal oxides can be obtained in connection with the method of feeding the gases for the auxiliary reaction concentrically around the reaction gas by discharging at least one of the gases for the auxiliary reaction in a direction intersecting with the direction of the reaction gas stream. In this manner a more intimate contact of the reaction gases with the auxiliary flame is attained than in the case where the gas streams of the auxiliary flame are directed parallel to the reaction gas stream. By this intimate contact of the reaction mixture with the auxiliary flame the ignition of the reaction mixture and therefore the decomposition of the mixture can be accelerated to cause the formation of a product having a finer average grain size.

A considerable effect can already be attained if only one, especially the outermost gas stream of the auxiliary flame is directed into the reaction gas current. A still greater effect is obtained if both the gas streams of the auxiliary flame are directed into the reaction gas current.

The combustible gas and separately introduced oxygen for its combustion may be burned during a whirling or spinning motion around the reaction mixture flowing into the reaction chamber. In this case the spinning motion of the burning gases may be regulated in such a way that the intimate contact of the auxiliary flame with the reaction mixture causes simultaneously the quick mixing of the combustion products with the reaction gas. It is also possible, however, to feed the reaction gas mixture itself to the reaction chamber in a spinning motion; in this case, provided that all or only two of the gas currents have been twisted, these spinning motions may be equally or oppositely directed, in any combination.

When the process is carried out on a smaller scale it is advantageous to heat the walls of the reaction chamber by special means since in this case, owing to the high loss of heat to the outside, the heat developed by the auxiliary flame may not be sufficient for overcoming said heat loss. When the process is carried out on a larger technical scale, the thermal insulation of the reaction chamber may be sufficient that the heat of reaction of the auxiliary flame and the heat of the chloride decomposition are enough to overcome the heat loss.

The metal chloride vapor may be mixed with the oxygen-containing gas in various manners. The oxygen-containing gas can be fed to the still or to the sublimation chamber for the metal chloride to be volatilized and then the mixture can be preheated together, if necessary, in a preheater by means of high pressure steam, gas or electrically or by any other manner as known per se, but it is also possible to volatilize and possibly preheat the metal chlorides alone and only then mix them with the cold or also preheated oxygen-containing gas. This mixing can be effected only shortly before entering the reaction chamber. Since all these preparatory operations, i. e. mixing, distilling, preheating, take place at temperatures below 500° C., it is possible to carry them out in metal apparatuses.

These advantages and the facilitated production of fine-grained products attained by the preceding mixing afford a considerable simplification as compared to all existing methods and devices for the production of metal oxides from metal chlorides.

Some embodiments of apparatuses which may be used for carrying out the invention will be hereinafter described by way of example and purely schematically with reference to the accompanying drawings, in which:

Figs. 2 and 3 are similar sections, showing modified forms of a vertical reaction chamber;

Fig. 4 is a perspective view showing the front end of a burner;

Figs. 5 and 6 are similar views, but showing modified forms;

Figs. 7 and 8 are end views of two modified forms of burners;

Similar reference numerals denote similar parts in the different views.

Figure 1:
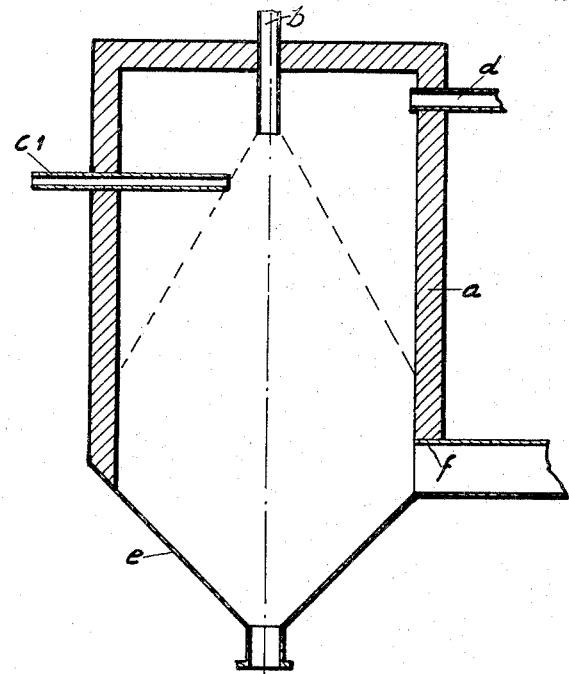
Fig. 1 is a longitudinal section of a vertical reaction chamber.

Referring now to the drawings in greater detail, it will be seen that the device for carrying out the process according to the invention in general consists of a reaction chamber formed by heat-insulated walls ($a$) with feed pipe ($b$) for the reaction gas mixture. The reaction chamber is provided with feed ducts ($c$) for the components of the auxiliary chemical reaction permitting the ignition of the reaction gas, and, if necessary, may be provided with a further oxygen feed pipe ($d$) for delivering the additionally required oxygen. It is also possible to provide a reaction chamber with several feed pipes for the reaction gas mixture, igniting the discharging reaction gas currents by one common or preferably by several auxiliary flames.

Figure 2:
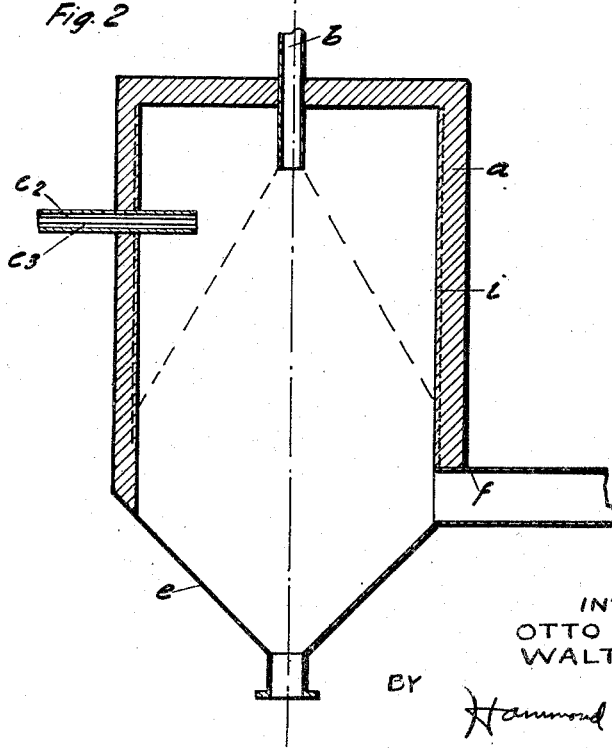

In addition the devices shown in Figs. 1 to 3 are provided with a funnel $e$ serving to carry away the precipitated metal oxides and an exhaust opening $f$ for drawing off the raw end gases. Since the raw end gases still contain substantial quantities of metal oxide, they are advantageously delivered to a dust-extracting plant.

Fig. 1 shows a vertical reaction chamber with a feed pipe $c_1$ for the gases serving for the auxiliary chemical flame.

Fig. 2 shows a device with lateral concentric feed pipes $c_2$ and $c_3$, advantageously designed in the form of a burner, for the gases of the auxiliary flame.

Fig. 3 shows a device with annular feed channels $c_4$ and $c_5$ for the gases of the auxiliary flame, arranged concentrically around the feed pipe $b$ for the reaction gases. For instance, duct $c_4$ may serve for feeding a combustible gas, such as carbon monoxide, hydrogen or hydrocarbon, while the duct $c_5$ serves for delivering the oxygen required for burning this gas.

Fig. 4 shows in greater detail a burner or ignition device combined with the feed pipe for the reaction gas mixture, in which the feed pipe $b$ for the reaction gas is provided with helically shaped partition walls $g$ imparting the required spin to the reaction gases. For the rest, the reaction chamber for installation of this burner or any of the burners shown in Figs. 5 to 10 may take any of the forms shown in Figs. 1 to 3.

Fig. 5 shows a similar burner with annular feed ducts $c_4$ and $c_5$ arranged concentrically around the reaction gas pipe $b$, for feeding the gases for the auxiliary flame, said annular ducts being provided with partition walls $h$ for imparting a spinning motion.

Fig. 6 shows a combination of the devices of Figs. 4 and 5, i. e. a feeding device in which the twist-imparting helical partition walls $g$ or $h$ are provided both in the annular feed pipes $c_4$ and $c_5$ and in the central feed pipe $b$ for the reaction gases. The guide blades in these examples are disposed in such a way that the spin of one of the gases of the auxiliary flame produced in the intermediate feed pipe $c_4$ is opposed to both that produced by the partition walls $g$ of the reaction gas feed pipe $b$ and to the spin of the other gas of the auxiliary flame produced by the partition surfaces $h$ of the outer feed pipe $c_5$. By varying the positions of the guide blades in the various feed pipes, twisting motions can be produced which are directed equally or oppositely in any desired combination.

Figs. 7 and 8 show in a front view two burners in which several non-concentrical feed ducts $c_6$ and $c_7$ for at least one of the gases of the auxiliary flame are arranged around the central feed pipe $b$ of the reaction gas. The pipe axes in this case are directed to skew against the axis of the central reaction gas feed pipe $b$ that they do not intersect it. In Fig. 7 this arrangement is adopted only for the feed pipe $c_6$ of one of the gases of the auxiliary flame while an annular feed pipe $c_4$ is provided for the other gas. In Fig. 8, on the other hand, the other reaction gas is also fed to the reaction chamber by feed pipes $c_7$ arranged skew in the same manner as at $c_6$. In these arrangements it is also possible to impart a spin to the reaction gas by providing its feed pipe with oblique partition walls $g$ as in Fig. 4. The heating elements possibly provided for heating the walls of the reaction chamber are shown by way of example in the form of electrical heaters $i$ in Fig. 2.

Figures 9, 10:
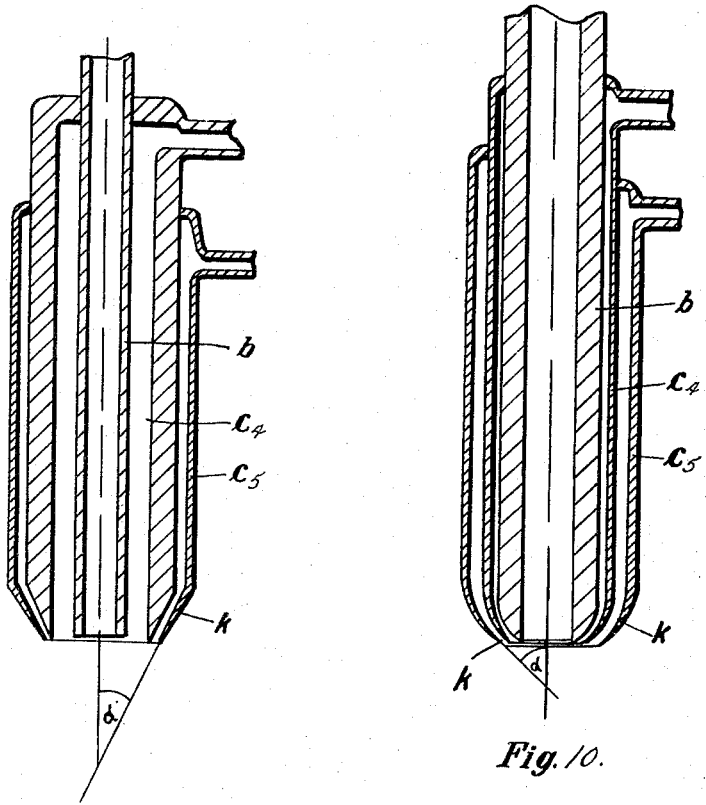
Figs. 9 and 10 are sectional views of two further forms of burners.

Fig. 9 is a sectional view of a burner with concentric feed pipes $b$, $c_4$ and $c_5$ for the reaction gas or the gases for the auxiliary flame, respectively, in which the outermost gas stream can be directed into the reaction gas stream. To this end the outermost feed pipe $c_5$ is provided with a conically shaped end member $k$. Fig. 10 shows a sectional view of a burner which is similar to Fig. 9, except that the two feed pipes for the gases for the auxiliary flame $c_4$ and $c_5$ are provided with a conically shaped end member $k$.

In the embodiment of Fig. 9 the walls of the conically shaped ends of the outermost feed pipe are straight conical surfaces, while in Fig. 10 the walls of the conically shaped ends of the feed pipes are curved parabolically. Instead of a parabolical curvature a circular, elliptical or other curvature would also be possible. Advantageously the angle of the conical surface of the cone or of the tangential surfaces in case of a curved configuration of the tapered portion relative to the central axis amounts to 45 to 60°. The mixing will be more or less intensive, depending on the size of this angle.

Burners such as those shown in Figs. 9 and 10 may also be provided with twist-imparting means such as those shown in Figs. 4 to 6.

The process according to the invention and its materialisation in the aforedescribed devices will now be explained in greater detail by way of some examples.

*Example 1.*—Through a feed pipe $b$ a mixture of 1 part by volume of titanium tetrachloride vapor and 3 parts by volume of air enriched to an oxygen content of 50 percent oxygen was introduced into a reaction chamber similar to that shown in Fig. 2, with a temperature of 100° C. and a velocity of 10 m./sec. In a laterally arranged burner, consisting of the concentric feed pipes $c_2$ and $c_3$, 0.1 part by volume of benzine vapor was burnt with 1.5 parts by volume of oxygen, adjusting the ignition flame in such a way that its tip came into intimate contact with the reaction gas current. A yield of 96 percent of titanium oxide with an average particle size of 1 micron was obtained.

*Example 2.*—Through the central pipe $b$ of a burner device as per Fig. 3 a reaction gas consisting of 1 part by volume of titanium chloride and 0.8 part by volume of oxygen was introduced into a reaction chamber as per Fig. 2 with an outlet velocity of 5 m./sec. and a temperature of 150° C. 1 part by volume of carbon monoxide was introduced through the annular feed duct $c_4$ and 1 part by volume of oxygen was introduced through the feed pipe $c_5$ and ignited. The outlet velocity of the latter two gases amounted to 8 m./sec. The reaction gas mixture was ignited at a distance of 3 cms. from the outlet opening. A yield of 99 percent of a product with an average particle size of 0.75 micron was obtained.

*Example 3.*—Through a burner as per Fig. 6, the following gases were introduced into a reaction chamber as per Fig. 2: Through the central tube $b$ a mixture of 1 part by volume of titanium chloride vapor and 1.5 parts by volume of oxygen (temperature 250° C., velocity 20 m./sec.); through the feed duct $c_4$ 0.8 part by volume of carbon monoxide, and through the feed duct $c_5$ 0.4 part by volume of oxygen. The reaction gas ignited at a distance of 5 to 10 cms. A yield of 99 percent of a product of 0.5 micron particle size was obtained.

*Example 4.*—Through the same device as in the preceding example there were introduced into the reaction chamber: Through the central pipe a mixture of 1 part by volume of zirconium tetrachloride vapor and 1.5 parts by volume of oxygen (with 300° C. and a velocity of 20 m./sec.). With conditions which for the rest were the same as in Example 3, a zirconium oxide of 0.75 micron average particle size was obtained.

*Example 5.*—Through a burner as per Fig. 8 there was introduced into a reaction chamber as per Fig. 2: In the central feed pipe $b$ a mixture of 1 part by volume of aluminum chloride and 3 parts by volume of oxygen (discharge temperature 250° C., velocity 20 m./sec.), through the feed ducts $c_6$ 1 part by volume of illuminating gas and through the feed ducts $c_7$ 2 parts by volume of oxygen. The aluminum oxide produced with a yield of 96 percent had an average particle size of 1 micron.

*Example 6.*—The following gases were fed through a device, i. e., a burner, as per Fig. 9 whose cone angle is 60°, into a reaction chamber of the type shown in Fig. 3: Through the central pipe $b$ a mixture of 1 part by volume of titanium chloride vapor and 1.3 parts by volume of oxygen with a temperature of 120° C. and an exit velocity of 20 m./sec., through the feed duct $c_4$ 1 part by volume of carbon monoxide with a velocity of 4 m./sec., and through the feed duct $c_5$ 0.5 part by volume of oxygen with an exit velocity of 5 m./sec. The reaction gas was ignited at a distance of 1 cm. A titanium oxide of 0.4 micron average size of the single particle was obtained.

*Example 7.*—There was delivered into the same reaction chamber as per Example 6, through a burner as per Fig. 10, with a cone angle of the intermediate feed duct of 60° and of the outer feed duct of 45°: In the central pipe $b$ a mixture of 1 part by volume of titanium chloride vapor and 1 part by volume of oxygen (temperature 150° C., exit velocity 15 m./sec.), through the feed pipe $c_4$ 1 part by volume of carbon monoxide (velocity 3 m./sec.) and through the feed duct $c_5$ 0.8 part by volume of oxygen with 4 m./sec. A product with an average size of the single crystal of 0.2 micron was obtained.

As various possible embodiments might be made of the above invention, and as various changes might be made in the embodiments above set forth, it is to be understood that all matter herein set forth or shown in the accompanying drawing is to be interpreted as illustrative and not in a limiting sense.

We claim:

1. The method of producing a finely divided oxide of a metallic element from those in groups 3 and 4 of the periodic system that form volatile chlorides, which comprises continuously burning a mixture of a vaporized anhydrous chloride of said element and oxygen containing gas in a streaming flame thereof within an enveloping flame formed from a surrounding combustible gas stream having a substantially higher flame temperature than said mixture.

2. The process of producing a very finely divided oxide of a metallic element from those in groups 3 and 4 of the periodic system which form volatile chlorides, which comprises continuously projecting downwardly into a reaction chamber a stream of a preformed mixture of a vaporized anhydrous chloride of said element and a gas containing oxygen in an amount substantially exceeding that required for complete decomposition and oxidation of the chloride vapor, said mixture being at a temperature between the dew point of said chloride and 500° C., and igniting said stream in said zone and maintaining it in a flaming state by contacting it continuously with an auxiliary flame sustained by an inflow of carbon monoxide containing gas surrounding said stream and a separate inflow of oxygen containing gas surrounding the inflow of carbon monoxide containing gas, thereby intensively decomposing and oxidizing said chloride to form said very finely divided oxide.

3. The process of producing a very finely divided titanium dioxide which comprises continuously projecting downwardly into a reaction chamber a stream of a preformed mixture of a vaporized anhydrous titanium tetrachloride and a gas containing oxygen in an amount substantially exceeding that required for complete decomposition and oxidation of the titanium tetrachloride vapor, said mixture being at a temperature between the dew point of the titanium tetrachloride and 500° C., and igniting said stream in said zone and maintaining it in a flaming state by contacting it continuously with an auxiliary flame sustained by an inflow of carbon monoxide containing gas surrounding said stream and a separate inflow of oxygen containing gas surrounding the inflow of carbon monoxide containing gas, thereby intensively decomposing and oxidizing the titanium tetrachloride to form the very finely divided titanium dioxide.

4. The process of producing a very finely divided zirconium dioxide which comprises continuously projecting downwardly into a reaction chamber a stream of a preformed mixture of a vaporized anhydrous zirconium tetrachloride and a gas containing oxygen in an amount substantially exceeding that required for complete decomposition and oxidation of the zirconium tetrachloride vapor, said mixture being at a temperature between the dew point of the zirconium tetrachloride and 500° C., and igniting said stream in said zone and maintaining it in a flaming state by contacting it continuously with an auxiliary flame sustained by an inflow of carbon monoxide containing gas surrounding said stream and a separate inflow of oxygen containing gas surrounding the inflow of carbon monoxide containing gas, thereby intensively decomposing and oxidizing the zirconium tetrachloride to form the very finely divided zirconium dioxide.

5. The process of producing a very finely divided oxide of a metallic element from those in groups 3 and 4 of the periodic system which form volatile chlorides, which comprises continuously supplying into a reaction zone a gas stream containing a vaporized anhydrous chloride of said element and oxygen to support combustion of the chloride vapor, the chloride vapor and oxygen in said stream being in a homogenously mixed state, and igniting said stream in said zone and maintaining it in a flaming state by contacting it continuously with an auxiliary flame sustained around said stream by a combustible gas inflow surrounding said stream, thereby intensively decomposing and oxidizing said chloride to form said very finely divided oxide.

6. The process of producing a very finely divided oxide of a metallic element from those in groups 3 and 4 of the periodic system which form volatile chlorides, which comprises continuously supplying into a reaction zone a gas stream containing a vaporized anhydrous chloride of said element and oxygen to support combustion of the chloride vapor, the chloride vapor and oxygen in said stream being in a homogeneously mixed state, and igniting said stream in said zone and maintaining it in a flaming state by contacting it continuously with an auxiliary flame sustained by burning carbon monoxide with oxygen introduced in respective streams separate from said stream, thereby intensively decomposing and oxidizing said chloride to form said very finely divided oxide.

7. The process of producing a very finely divided oxide of a metallic element from those in groups 3 and 4 of the periodic system which form volatile chlorides, which comprises continuously supplying into a reaction zone a gas stream containing a preformed mixture of a vaporized anhydrous chloride of said element and oxygen to support combustion of the chloride vapor, and igniting said stream in said zone and maintaining it in a flaming state by contacting it continuously with an auxiliary flame sustained by separate inflows of a combustible gas and an oxygen containing gas surrounding said stream, thereby intensively decomposing and oxidizing said chloride to form said very finely divided oxide.

8. The process of producing a very finely divided oxide of a metallic element from those in groups 3 and 4 of the periodic system which form volatile chlorides, which comprises continuously supplying into a reaction zone a gas stream containing a vaporized anhydrous chloride of said element and oxygen to support combustion of the chloride vapor, the chloride vapor and oxygen in said stream being in a homogeneously mixed state, and igniting said stream in said zone and maintaining it in a flaming state by contacting it continuously with an auxiliary flame sustained by separate inflows of a combustible gas and an oxygen containing gas surrounding said stream, at least one of said inflows being directed towards the axis of said stream, thereby intensively decomposing and oxidizing said chloride to form said very finely divided oxide.

9. The process of producing a very finely divided oxide of a metallic element from those in groups 3 and 4 of the periodic system which form volatile chlorides, which comprises continuously supplying into a reaction zone a gas stream containing a vaporized anhydrous chloride of said element and oxygen to support combustion of the chloride vapor, the chloride vapor and oxygen in said stream being in a homogeneously mixed state, and igniting said stream in said zone and maintaining it in a flaming state by contacting it continuously with an auxiliary flame sustained by an inflow of carbon monoxide containing gas surrounding said stream and a separate inflow of oxygen containing gas surrounding the inflow of carbon monoxide containing gas, thereby intensively decomposing and oxidizing said chloride to form said very finely divided oxide.

10. The process of producing a very finely divided oxide of a metallic element from those in groups 3 and 4 of the periodic system which form volatile chlorides, which comprises continuously supplying into a reaction zone a stream of an ignitable homogeneous mixture of a vaporized anhydrous chloride of said element and oxygen containing gas, and igniting said stream in said zone and maintaining it in a flaming state by contacting it continuously with an auxiliary flame sustained by burning a combustible gas with oxygen introduced in respective streams separate from said stream, the oxygen content of the chloride containing stream being less than enough to support complete oxidation of the chloride and the separate oxygen containing stream supplying enough supplementary oxygen to maintain such complete oxidation, thereby intensively decomposing and oxidizing said chloride to form said very finely divided oxide.

11. The process of producing a very finely divided aluminum oxide which comprises continuously supplying into a reaction zone a stream of an ignitable homogeneous mixture of a vaporized anhydrous aluminum trichloride and oxygen containing gas and igniting said stream in said zone and maintaining it in a flaming state by contacting it continuously with an auxiliary flame sustained by a combustible gas inflow separate from said stream, thereby decomposing and oxidizing the aluminum trichloride to form a very finely divided aluminum oxide.

12. The method of producing pigmentary titanium dioxide, which comprises continuously forming in a reaction zone a streaming annular flame of combustible gas and supplying concurrently within and burning in contact with said flame a separate gaseous stream containing titanium tetrachloride in admixture with at least enough oxygen to oxidize the same completely, thereby intensively decomposing and oxidizing the titanium tetrachloride into finely divided titanium dioxide.

13. The method of producing a finely divided silicon dioxide, which comprises continuously forming in a reaction zone a streaming annular flame of combustible gas and supplying concurrently within and burning in contact with said flame a separate gaseous stream containing silicon tetrachloride in admixture with at least enough oxygen to oxidize the same completely, thereby intensively decomposing and oxidizing the silicon tetrachloride into finely divided silicon dioxide.

References Cited in the file of this patent

UNITED STATES PATENTS

| Number | Name | Date |
|---|---|---|
| 813,786 | Fink-Huguenot | Feb. 27, 1906 |
| 885,766 | De Laval | Apr. 28, 1908 |
| 1,850,286 | Mittasch et al. | Mar. 22, 1932 |
| 1,931,381 | Haber | Oct. 17, 1933 |
| 1,967,235 | Ferkel | July 24, 1934 |
| 2,072,375 | McCallum | Mar. 2, 1937 |
| 2,155,119 | Ebner | Apr. 18, 1939 |
| 2,222,031 | Hammer | Nov. 19, 1940 |
| 2,232,727 | Peterkin et al. | Feb. 25, 1941 |
| 2,333,948 | Muskat | Nov. 9, 1943 |
| 2,347,496 | Muskat et al. | Apr. 25, 1944 |
| 2,367,118 | Heinen | Jan. 9, 1945 |
| 2,394,633 | Pechukas et al. | Feb. 12, 1946 |
| 2,445,691 | Pechukas | July 20, 1948 |
| 2,462,978 | Krchma et al. | Mar. 1, 1949 |
| 2,512,341 | Krchma | June 20, 1950 |

FOREIGN PATENTS

| Number | Country | Date |
|---|---|---|
| 348,138 | Great Britain | May 4, 1931 |
| 358,492 | Great Britain | Oct. 7, 1931 |
| 434,150 | Great Britain | Aug. 27, 1935 |
| 535,213 | Great Britain | Apr. 2, 1941 |
| 535,214 | Great Britain | Apr. 2, 1941 |
| 562,620 | Great Britain | July 10, 1944 |